(12) United States Patent
Raghavan et al.

(10) Patent No.: US 11,871,364 B2
(45) Date of Patent: Jan. 9, 2024

(54) POWER HEADROOM REPORTING WITH GRATING LOBES

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/304,208

(22) Filed: Jun. 16, 2021

(65) Prior Publication Data
US 2022/0408376 A1 Dec. 22, 2022

(51) Int. Cl.
*H04W 52/36* (2009.01)
*H04W 52/24* (2009.01)

(52) U.S. Cl.
CPC ....... *H04W 52/365* (2013.01); *H04W 52/243* (2013.01)

(58) Field of Classification Search
CPC ............ H04W 52/365; H04W 52/243; H04W 52/367; H04W 52/34
See application file for complete search history.

(56) References Cited

U.S. PATENT DOCUMENTS

| | | | |
|---|---|---|---|
| 5,422,648 A * | 6/1995 | Uematsu | G01S 3/48 342/359 |
| 2013/0088393 A1* | 4/2013 | Lee | G01S 7/354 342/372 |
| 2020/0145079 A1* | 5/2020 | Marinier | H04W 74/0833 |
| 2020/0396694 A1* | 12/2020 | Comsa | H04W 52/281 |

* cited by examiner

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, an apparatus of a user equipment (UE) may transmit a power headroom (PHR) parameter. The PHR parameter may be based at least in part on a beam being associated with a grating lobe and a main lobe. A power of the grating lobe may be within a power threshold of a power of the main lobe. The apparatus may perform a communication using the beam based at least in part on the PHR parameter. Numerous other aspects are described.

30 Claims, 10 Drawing Sheets

POWER HEADROOM REPORTING WITH GRATING LOBES

FIELD OF THE DISCLOSURE

Aspects of the present disclosure generally relate to wireless communication and to techniques and apparatuses for power headroom (PHR) reporting with grating lobes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by an apparatus of a user equipment (UE) includes transmitting a power headroom (PHR) parameter, wherein the PHR parameter is based at least in part on a beam being associated with a grating lobe and a main lobe, and wherein a power of the grating lobe is within a power threshold of a power of the main lobe; and performing a communication using the beam based at least in part on the PHR parameter.

In some aspects, a method of wireless communication performed by an apparatus of a wireless node includes receiving a PHR parameter, wherein the PHR parameter is based at least in part on a beam being associated with a grating lobe and a main lobe, and wherein a power of the grating lobe is within a power threshold of a power of the main lobe; and performing a communication using the beam based at least in part on the PHR parameter.

In some aspects, an apparatus of a UE for wireless communication includes a memory; and one or more processors, coupled to the memory, configured to: transmit a PHR parameter, wherein the PHR parameter is based at least in part on a beam being associated with a grating lobe and a main lobe, and wherein a power of the grating lobe is within a power threshold of a power of the main lobe; and perform a communication using the beam based at least in part on the PHR parameter.

In some aspects, an apparatus of a wireless node for wireless communication includes a memory; and one or more processors, coupled to the memory, configured to: receive a PHR parameter, wherein the PHR parameter is based at least in part on a beam being associated with a grating lobe and a main lobe, and wherein a power of the grating lobe is within a power threshold of a power of the main lobe; and perform a communication using the beam based at least in part on the PHR parameter.

In some aspects, a non-transitory computer-readable medium storing a set of instructions for wireless communication includes one or more instructions that, when executed by one or more processors of an apparatus of a UE, cause the one or more processors to: transmit a PHR parameter, wherein the PHR parameter is based at least in part on a beam being associated with a grating lobe and a main lobe, and wherein a power of the grating lobe is within a power threshold of a power of the main lobe; and perform a communication using the beam based at least in part on the PHR parameter.

In some aspects, a non-transitory computer-readable medium storing a set of instructions for wireless communication includes one or more instructions that, when executed by one or more processors of an apparatus of a wireless node, cause the one or more processors to: receive a PHR parameter, wherein the PHR parameter is based at least in part on a beam being associated with a grating lobe and a main lobe, and wherein a power of the grating lobe is within a power threshold of a power of the main lobe; and perform a communication using the beam based at least in part on the PHR parameter.

In some aspects, an apparatus of a UE for wireless communication includes means for transmitting a PHR parameter, wherein the PHR parameter is based at least in part on a beam being associated with a grating lobe and a main lobe, and wherein a power of the grating lobe is within a power threshold of a power of the main lobe; and means for performing a communication using the beam based at least in part on the PHR parameter.

In some aspects, an apparatus of a wireless node for wireless communication includes means for receiving a PHR parameter, wherein the PHR parameter is based at least in part on a beam being associated with a grating lobe and a main lobe, and wherein a power of the grating lobe is within a power threshold of a power of the main lobe; and means for performing a communication using the beam based at least in part on the PHR parameter.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
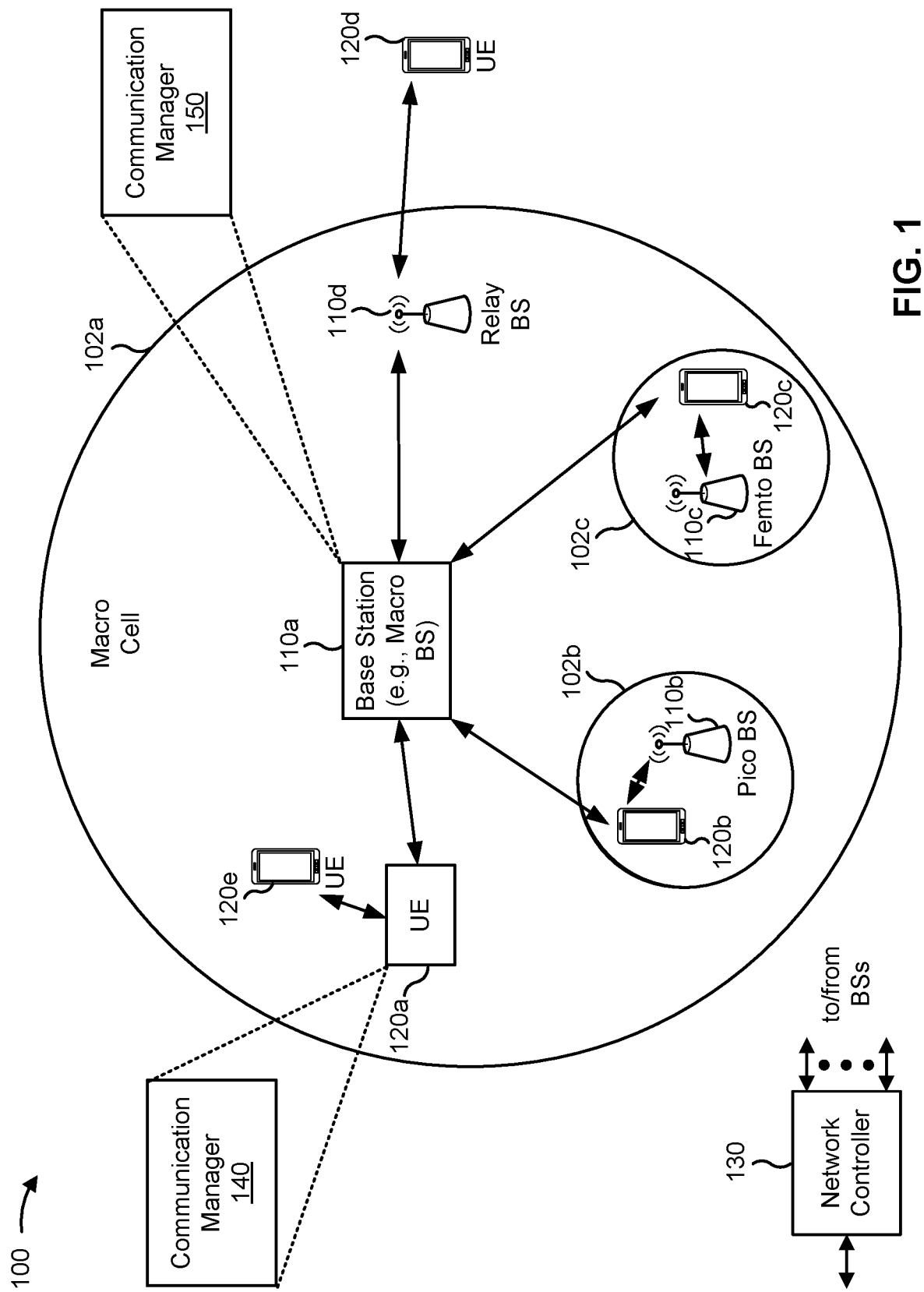
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may perform one or more operations associated with power headroom (PHR) reporting with grating lobes. Additionally, or alternatively, the communication manager 140 may perform one or more other operations described herein. In some aspects, the base station 110 may include a communication manager 150. As described in more detail elsewhere herein, the communication manager 150 may perform one or more operations associated with PHR reporting with grating lobes. Additionally, or alternatively, the communication manager 150 may perform one or more other operations described herein.

As indicated above, FIG. 1 is provided as an example. Other examples may differ from what is described with regard to FIG. 1.

Figure 2:
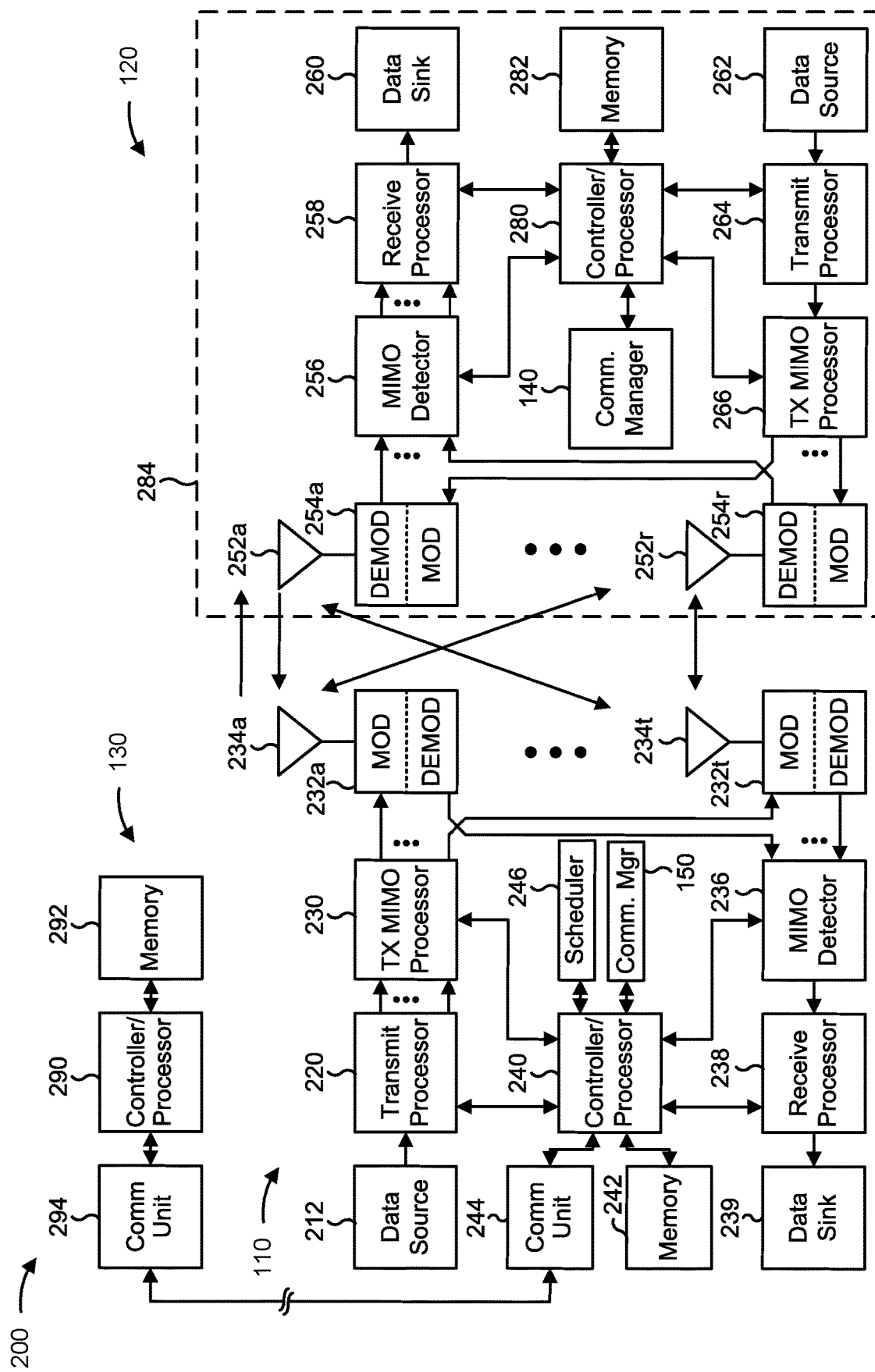
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6 and 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6 and 7.

Controller/processor 240 of base station 110, controller/processor 280 of UE 120, and/or any other component(s) of FIG. 2 may perform one or more techniques associated with PHR reporting with grating lobes, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, an apparatus (e.g., one or more components of the UE 120 as depicted in FIG. 2) of a UE (e.g., UE 120) includes means for transmitting a PHR parameter, wherein the PHR parameter is based at least in part on a beam being associated with a grating lobe and a main lobe, and wherein a power of the grating lobe is within a power threshold of a power of the main lobe; and/or means for performing a communication using the beam based at least in part on the PHR parameter. In some aspects, the means for the apparatus to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, an apparatus (e.g., one or more components of the base station 110 or the UE 120 as depicted in FIG. 2) of a wireless node (e.g., base station 110 or UE 120) includes means for receiving a PHR parameter, wherein the PHR parameter is based at least in part on a beam being associated with a grating lobe and a main lobe, and wherein a power of the grating lobe is within a power threshold of a power of the main lobe; and/or means for performing a communication using the beam based at least in part on the PHR parameter. In some aspects, the means for the apparatus to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
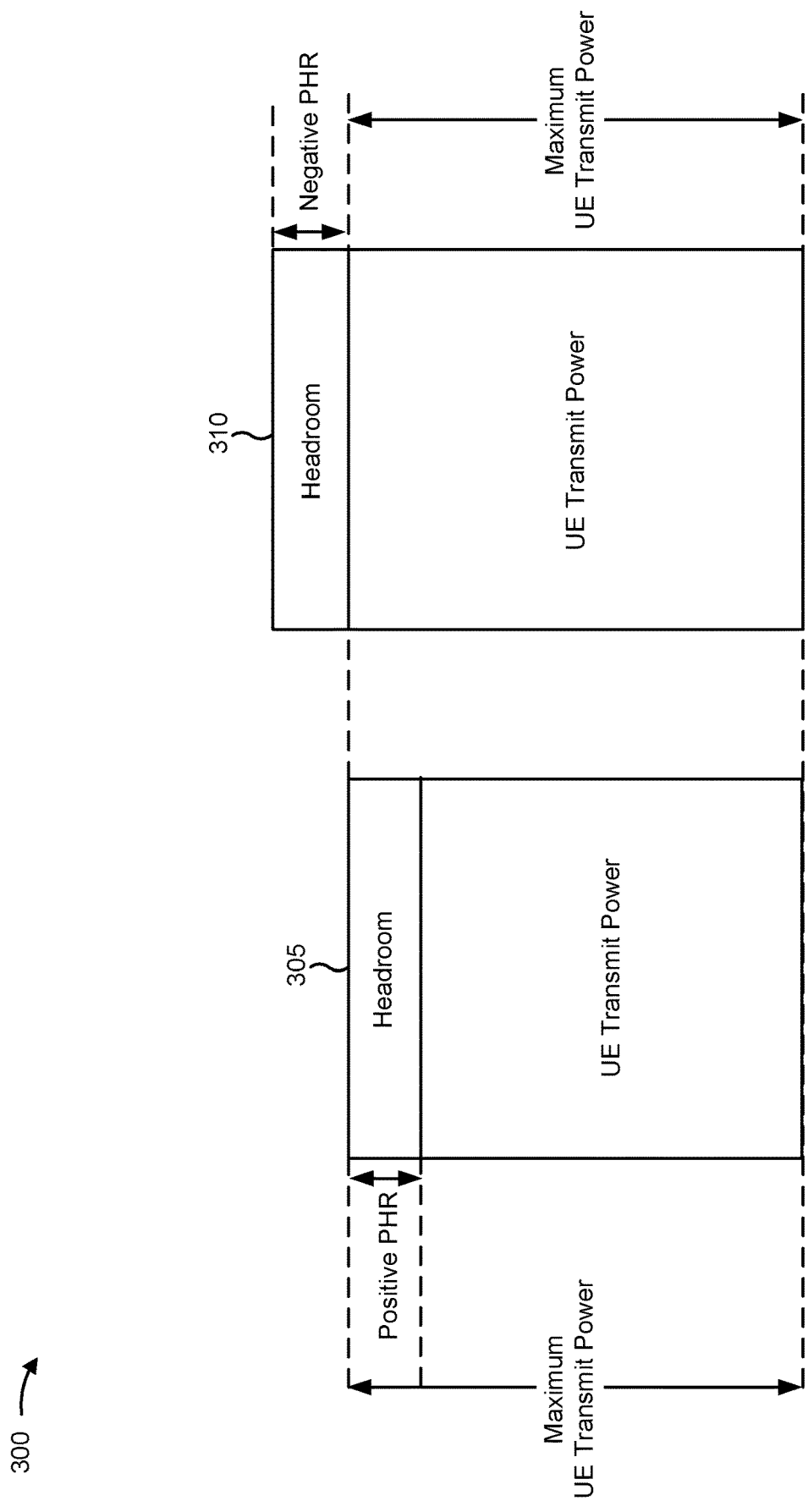
FIGS. 3A and 3B are diagrams illustrating an example of power headroom (PHR) reporting, in accordance with the present disclosure.
Figure 3B:
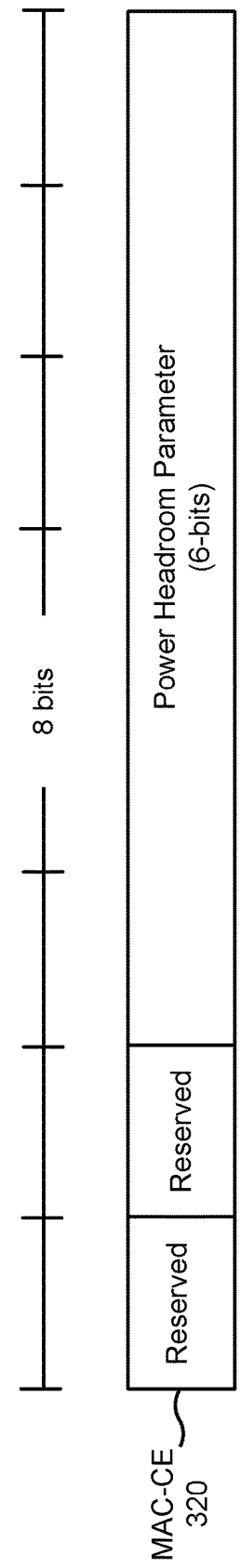

FIGS. 3A and 3B are diagrams illustrating an example 300 of PHR reporting, in accordance with various aspects of the present disclosure. Uplink power control may be used on an uplink channel (e.g., a physical uplink control channel (PUCCH) or a physical uplink shared channel (PUSCH)) to control the power at which a UE is transmitting to a base station. In some aspects, uplink power control may be based at least in part on a PHR value associated with the UE.

The PHR value may indicate a difference between a maximum transmission power associated with the UE and an estimated power for transmitting on an uplink channel per activated serving cell. The UE may determine the maximum transmission power to be used to calculate the PHR value based at least in part on one or more signals, of a plurality of signals, to be transmitted in an uplink transmission. The one or more signals may include, for example, an uplink control channel signal (e.g., a PUCCH signal, a shortened PUCCH (sPUCCH) signal, and/or the like), an uplink data channel signal (e.g., a PUSCH signal, a shortened PUSCH (sPUSCH) signal, an ultra-reliable low latency communication (URLLC) PUCCH, an enhanced mobile broadband (eMBB) PUCCH, and/or the like), a sounding reference signal (SRS), or another type of reference signal.

In some cases, the one or more signals include multiple signals (e.g., at least two signals, at least three signals, and/or the like) to be frequency division multiplexed in the uplink transmission. For example, an uplink control channel signal and an SRS may be frequency division multiplexed; an uplink data channel signal and an SRS may be frequency division multiplexed; an uplink control channel signal and an uplink data channel signal may be frequency division multiplexed; or an uplink control channel signal, an uplink data channel signal, and an SRS may be frequency division multiplexed.

In some cases, different signals, of the plurality of signals, may correspond to different maximum transmit powers (e.g., Pcmax or Pemax values). For example, a PUSCH signal may correspond to a first maximum transmit power (e.g., Pcmax A), a PUCCH signal may correspond to a second maximum transmit power (e.g., Pcmax B), and an SRS may correspond to a third maximum transmit power (e.g., Pcmax C).

The UE may determine the maximum transmit power, to be used to determine the PHR value, based at least in part on the one or more signals and the corresponding one or more maximum transmit powers. When different signals correspond to different maximum transmit powers, the UE may determine a particular maximum transmit power to be used to calculate the PHR value. For example, the PHR value may be calculated as a difference between a maximum transmit power and a transmit power that would have been used without power constraints (e.g., which may be an unconstrained transmit power for a single signal or a sum of unconstrained transmit powers for multiple signals, such as higher priority signals).

In some cases, a single signal is included in the uplink transmission and the UE may use the maximum transmit power corresponding to that single signal. In some cases, multiple signals may be frequency division multiplexed in the uplink transmission and the UE may determine a maximum transmit power based at least in part on the multiple signals. In some cases, the UE may select a maximum transmit power corresponding to the highest priority signal to be transmitted. For example, if the plurality of signals includes a signal on the uplink control channel (e.g., the PUCCH), then the UE may select the maximum transmit power that corresponds to the uplink control channel. In some cases, the UE may be configured to always use a particular maximum transmit power, associated with a particular signal (e.g., an uplink control channel signal) regardless of whether that signal is being transmitted. In this way, the UE may conserve processing resources by simplifying selection of the maximum transmit power value to be used to determine the PHR value.

In some cases, the UE may determine the maximum transmit power based at least in part on an indication, associated with the plurality of signals, indicated in a radio resource control (RRC) message. For example, an RRC message (e.g., from the base station 110) may indicate which maximum transmit power to use for different combinations of multiple signals. In some cases, the UE may determine the maximum transmit power based at least in part on a maximum transmit power of a signal that is included in the uplink transmission. In some cases, the UE may determine the maximum transmit power based at least in part on multiple maximum transmit powers corresponding to multiple signals included in the uplink transmission. For example, the UE may average the multiple maximum transmit powers, may select a maximum of the maximum transmit powers, or may select a minimum of the maximum transmit powers.

In some cases, the uplink transmission may be transmitted on a particular beam (e.g., a particular antenna beam), and different beams may be associated with different maximum transmit powers. The UE may determine the maximum transmit power based at least in part on a beam via which the uplink transmission is to be transmitted. In some cases, the UE may determine the maximum transmit power based at least in part on whether the plurality of signals are transmitted on a same beam or different beams. For example, if the plurality of signals are transmitted on different beams, the UE may use a maximum transmit power corresponding to a particular signal, such as an uplink control signal. In some cases, the UE may determine the maximum transmit power based at least in part on whether the signals to be included in the uplink transmission are frequency division multiplexed across an entire transmission time of the uplink transmission or a partial transmission time of the uplink transmission.

In some cases, the UE may determine the estimated power for an uplink transmission to be used to calculate the PHR. For an uplink transmission on the PUSCH, the UE may determine the estimated power according to the following equation:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \text{ [in dBm]},$$

where $P_{CMAX}$ is the maximum transmit power, $M_{PUSCH}(i)$ is the number of resource blocks assigned to the UE, $P_{O\_PUSCH}(j)$ is the target base station receive power, $\alpha(j) \cdot PL$ is the estimated path loss based compensation factor with PL denoting the path loss incurred and $\alpha(j)$ is a number between 0 and 1 which determines what fraction of the path loss is compensated by the power control loop, $\Delta_{TF}(i)$ is a correction factor based on the transmission format used (e.g., MCS), and $f(i)$ is a UE specific offset or closed loop power control correction factor. The estimated power for an uplink transmission on the PUCCH or SRS may be determined in a similar manner.

The UE may determine the PHR value based at least in part on subtracting the estimated power $P_{PUSCH}(i)$ from the maximum transmission power $P_{MAX}$ (e.g., PHR=$P_{MAX}$−$P_{PUSCH}(i)$). Because the estimated power is limited to the maximum transmission power, the PHR value may be determined prior to limiting the estimated power by the maximum transmission power (e.g., $P_{PUSCH}(i) = 10 \log_{10}(M_{PUSCH}(i)) + P_{O\_PUSCH}(j) + \alpha(j) \cdot PL + \Delta_{TF}(i) + f(i)$). As such, the PHR value may be a positive value or a negative value.

As shown in FIG. 3A, and by reference number 305, the PHR value may be a positive value when the estimated power is less than the maximum transmission power. As shown by reference number 310, the PHR value may be a negative value when the estimated power is greater than the maximum transmission power.

The UE may generate a PHR report that includes a PHR parameter. The PHR parameter may indicate the PHR value determined based at least in part on the maximum transmission power and the estimated transmission power. In some aspects, the UE may determine the PHR parameter based on a PHR report mapping 315, as shown in FIG. 3B.

As shown in FIG. 3B, the PHR report mapping 315 may map PHR values to PHR parameters. In some aspects, the PHR report mapping 315 may map a PHR value to a six-bit PHR parameter representing a range of 64 values from 0 through 63. The PHR report mapping 315 may map each of the 64 values to a respective PHR parameter. For example, the PHR report mapping 315 may map a PHR value that is less than −32 dB to a first six-bit PHR parameter (e.g., 000000).

In some cases, the UE may transmit the PHR report on an uplink control channel. In some cases, the UE may transmit the PHR report as part of uplink control information that is included on an uplink data channel (e.g., with or without inclusion of uplink data on the uplink data channel). In some aspects, the PHR report may be included in a medium access control channel-control element (MAC-CE) 320, for which an example MAC-CE structure is shown in FIG. 3B. As shown, the MAC-CE 320 may include six bits for conveying a PHR parameter and two reserved bits.

The base station may receive the PHR report and may utilize the PHR value indicated by the PHR parameter to perform one or more operations. For example, the base station may utilize the PHR value to derive a power control command, perform a power control operation, determine a quantity of resource blocks to be allocated to the PUSCH for the UE, identify an MCS associated with the UE, or calculate path loss towards the UE.

However, in some cases, the PHR value determined by the UE may be based at least in part on a beam associated with a grating lobe and a main lobe. A grating lobe is a second lobe that is created in association with a main lobe and that has a power that is substantially the same (e.g., within a power threshold) as the main lobe. For example, a beamforming configuration associated with generating the main lobe of a beam may cause the radiation of the grating lobes.

In some cases, the UE may operate at upper millimeter wave bands, such as FR4 (e.g., 52.6 GHz through 114.25 GHz frequency bands). The wavelength of a beam transmitted via the upper millimeter wave bands may be smaller than a wavelength of a beam transmitted at lower frequency wave bands (e.g., FR2 which encompasses the 24.25 to 52.6 GHz regime). The smaller wavelength at FR4 may allow a larger number of antenna elements to be included in a given physical aperture of the UE relative to a number of antenna elements for transmitting via lower frequency wave bands such as FR2. However, when the spacing between the antenna elements is greater than half the wavelength of transmissions, the beam may include a main lobe in a direction of the beam and a grating lobe of about the same amplitude as the main lobe but in a direction different from the direction of the main lobe. Thus, a fraction of power is transmitted on the main lobe and a fraction of power is transmitted on the grating lobe. In some aspects, the grating lobe may cause interference with other components of the UE and/or with communications of devices other than the UE of interest.

To compensate for the fraction of power transmitted on the grating lobe, an estimated transmission power calculated by the UE may be higher relative to an estimated transmission power calculated in the absence of a grating lobe. The higher estimated transmission power may result in a lower PHR value being calculated and/or reported by the UE. The base station may not be able to determine that the lower PHR value is based at least in part on the beam being associated with the grating lobe and the main lobe which may cause the base station to incorrectly estimate an amount of uplink bandwidth that the UE may use for another uplink transmission. In other words, the base station may schedule fewer uplink transmission resources based at least in part on the PHR parameter indicated in the PHR report. Additionally, the base station may not properly derive a power control command, perform a power control operation, determine a quantity of resource blocks to be allocated to the PUSCH for the UE, identify an MCS associated with the UE, or calculate path loss towards the UE.

Some aspects described herein may enable an apparatus of a UE to generate and/or transmit a PHR report that includes a PHR parameter indicating that a beam is associated with a grating lobe and a main lobe. For example, the PHR parameter may indicate a PHR value that is determined based at least in part on the beam being associated with a grating lobe and a main lobe, that indicates a transmit power relationship between the grating lobe and the main lobe, or the like. In some aspects, the PHR report and/or the PHR parameter may indicate additional information associated with the grating lobe. For example, the PHR report and/or the PHR parameter may indicate a direction of the grating lobe, whether the grating lobe has a potential impact on another UE, or the like. In this way, the apparatus of the UE may enable a base station to accurately derive a power control command, perform a power control operation, determine a quantity of resource blocks to be allocated to the PUSCH for the UE, identify an MCS associated with the UE, calculate path loss towards the UE, or the like based at least in part on the beam being associated with a grating lobe and a main lobe. Furthermore, an apparatus of the base station may use the PHR report and/or the PHR parameter to accurately derive a power control command, perform a power control operation, determine a quantity of resource blocks to be allocated to the PUSCH for the UE, identify an MCS associated with the UE, calculate path loss towards the UE, or the like based at least in part on the beam being associated with a grating lobe and a main lobe.

As indicated above, FIGS. 3A and 3B are provided merely as an example. Other examples are possible and may differ from what was described with regard to FIGS. 3A and 3B.

Figure 4:
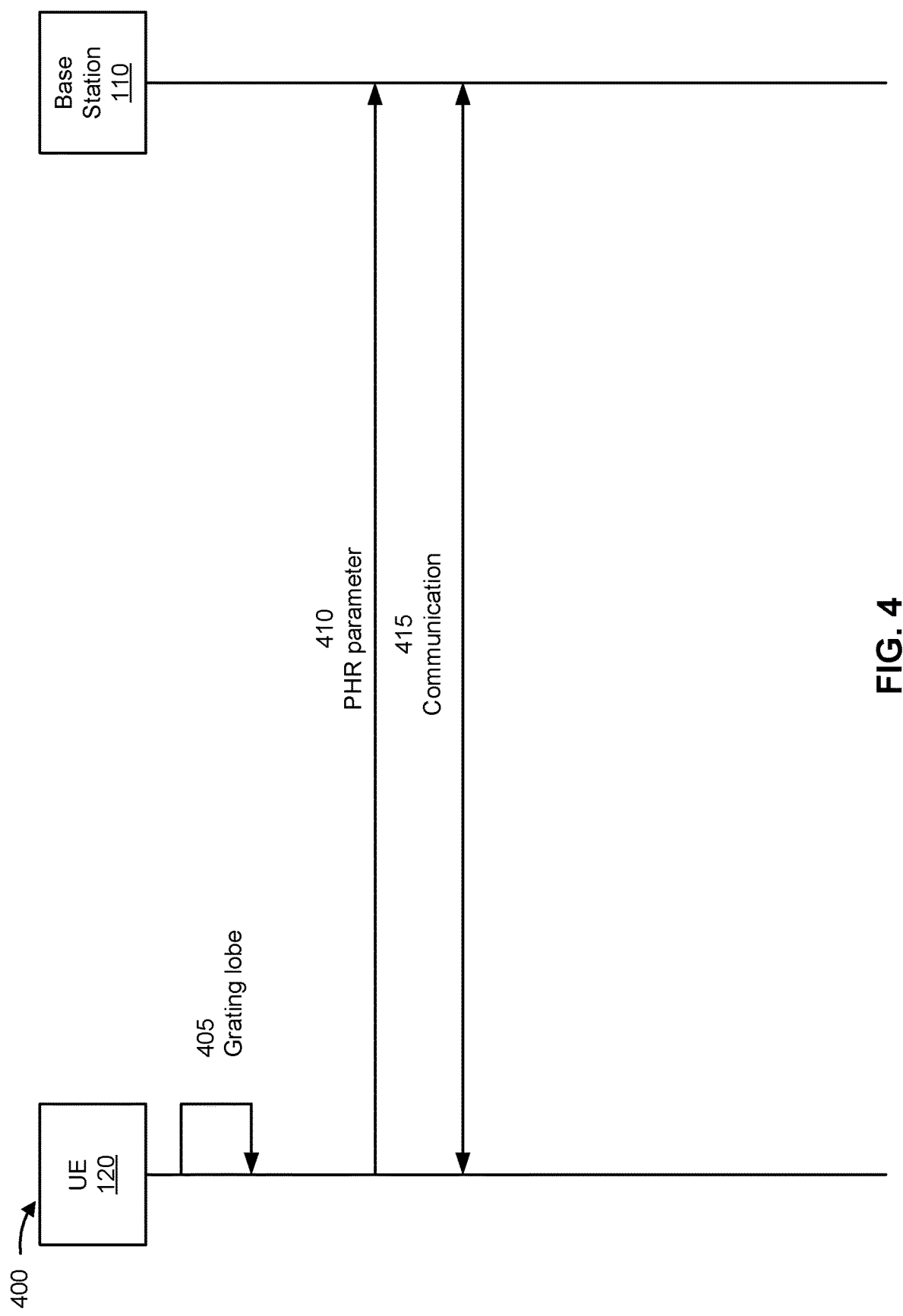
FIGS. 4 and 5 are diagrams illustrating examples associated with PHR reporting with grating lobes, in accordance with the present disclosure.
Figure 5:
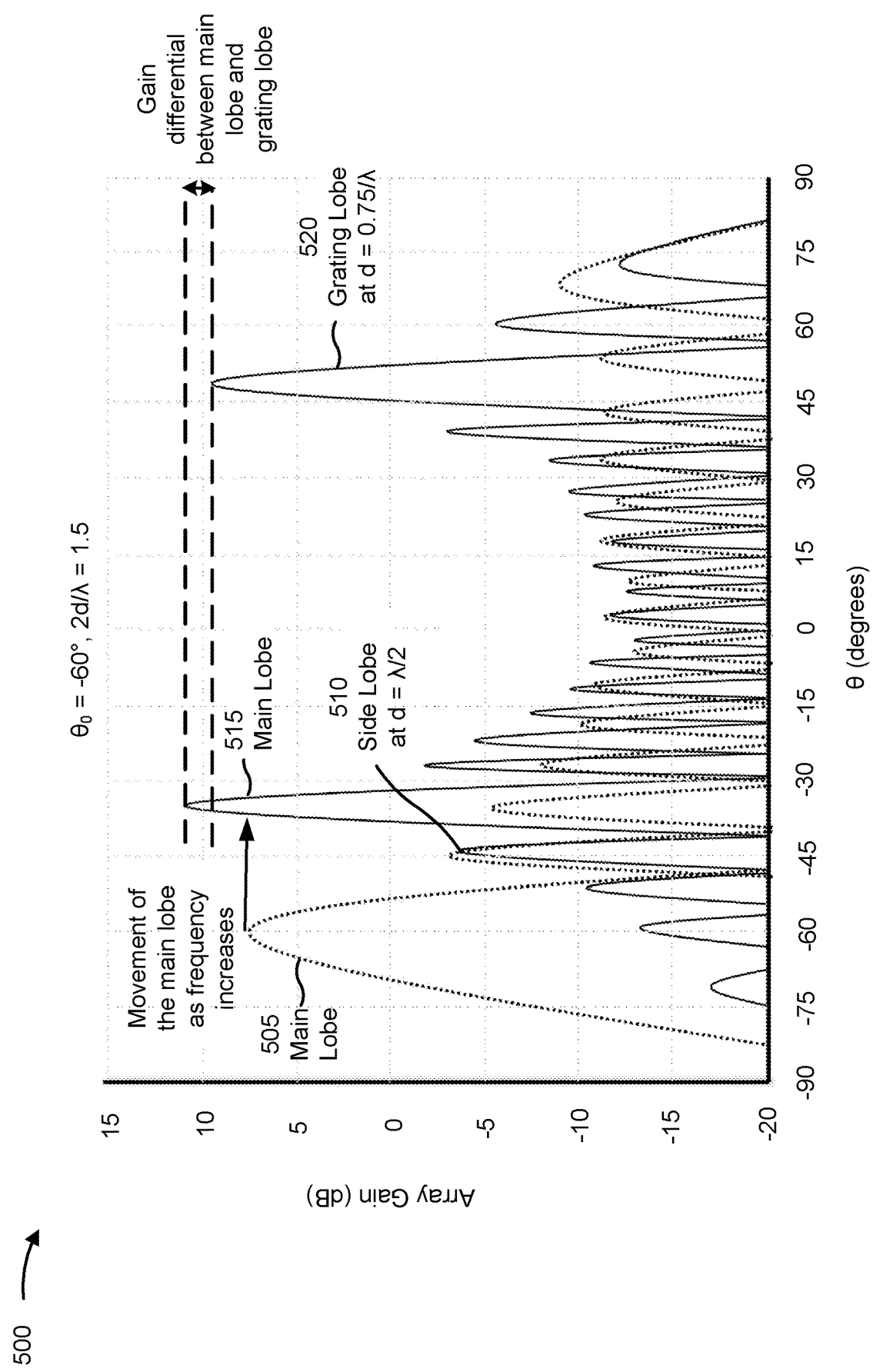

FIGS. 4 and 5 are diagrams illustrating examples 400 and 500, respectively, associated with PHR reporting with grating lobes, in accordance with the present disclosure. As shown in FIG. 4, a base station 110 and a UE 120 may communicate with one another.

As shown by reference number 405, the UE 120 may determine that a beam is associated with a grating lobe and a main lobe. For example, the UE 120 may switch from one carrier frequency to another carrier frequency and may determine that a beam is associated with a grating lobe and a main lobe based on an inter-antenna element spacing of the UE 120, an ultra-wide bandwidth covered by the UE 120, or the like.

As an example, the UE 120 may include a 16×1 linear array with an inter-antenna element spacing (d). The beam may have a peak gain direction of $\theta_0$ with d equal to one-half the wavelength of transmissions. As shown in FIG. 5, and by reference number 505, the beam (indicated in FIG. 5 by a dotted line) may be nominally steered to $\theta_0=-60°$ for $d=\lambda/2$. As shown by reference number 510, a first side lobe may be present at $d=\lambda/2$. A difference between a power of the main lobe and a power of the first side lobe may be greater than a power threshold. For example, the power of the main lobe may be greater than 13.2 dB and a value of the power threshold may be 10 dB.

In some aspects, the UE 120 switching from one carrier frequency to another, higher carrier frequency may cause a change in the direction of the main lobe. For example, as shown by reference number 515, the main lobe of the beam (indicated in FIG. 5 by a solid line) moves to about −30° as the frequency increases. Further, the increase in frequency causes a corresponding decrease in the wavelength of transmissions. In some aspects, the inter-antenna element spacing is fixed. The decrease in wavelength may cause the wavelength to be smaller than the inter-antenna element spacing, which may cause a grating lobe to be associated with the main lobe.

As shown by reference number 520, a grating lobe may be present at $d=0.75\lambda$. A difference between a power of the main lobe and a power of the grating lobe (e.g., a gain differential, as shown in FIG. 5) may be about zero (e.g., a power of the grating lobe may be about the same as a power of the main lobe) and/or may satisfy (e.g., may be less than) a power threshold. Further, a direction of the grating lobe may be different from a direction of the main lobe. As shown in FIG. 5, a difference between the direction of the grating lobe and the direction of the main lobe is about 90°. A portion of the transmit power of the UE 120 may be associated with the grating lobe and in a direction different from the main lobe, thereby causing the estimated transmit power calculated by the UE 120 to be higher relative to an estimated transmit power calculated when a grating lobe is not associated with the main lobe. The higher estimated transmit power may result in the UE 120 calculating and/or reporting a lower PHR value.

In some aspects, the UE 120 may determine that a grating lobe is associated with the main lobe based at least in part on the frequency of the beam. The UE 120 may calculate a wavelength of transmissions based at least in part on the frequency (e.g., $\lambda=1$/frequency). The UE 120 may determine that a grating lobe is associated with the main lobe based at least in part on a relationship between the wavelength and the inter-antenna element spacing. For example, the UE 120 may determine that a grating lobe is associated with the main lobe based at least in part on half the wavelength being less than or equal to the inter-antenna element spacing. Alternatively, and/or additionally, the UE 120 may determine that a grating lobe is associated with the main lobe based at least in part on accessing a data structure storing information associating one or more characteristics associated with a beam with information indicating whether the one or more characteristics associated with the beam (e.g., a frequency, a wavelength, an inter-element antenna spacing, and/or the like) may cause a grating lobe to be associated with a main lobe.

Returning now to FIG. 4, as shown by reference number 410, the UE 120 may transmit a PHR parameter indicating the PHR value calculated by the UE 120 to the base station 110. In some aspects, the UE 120 may determine the PHR parameter based at least in part on a PHR report mapping (e.g., PHR report mapping 315) as described elsewhere herein. The PHR parameter may be included in a PHR bit-field of a PHR report. In some aspects, the PHR bit-field may be a six-bit PHR bit-field. The PHR parameter may be one of 64 variables indicating respective PHR values, as described elsewhere herein.

In some aspects, the UE 120 may transmit an indication that the grating lobe is associated with the main lobe. In some aspects, the indication that the grating lobe is associated with the main lobe may be included in the PHR report. In some aspects, the indication that the grating lobe is associated with the main lobe may be transmitted separate from the PHR report. For example, the indication that the grating lobe is associated with the main lobe may be transmitted via RRC signaling or a MAC-CE, among other examples.

In some aspects, the PHR bit-field may be greater than six bits. The PHR bit-field may be greater than six bits to enable the UE 120 to report a greater range of PHR values relative to the six-bit PHR bit-field. The greater range of PHR values may be based at least in part on the grating lobe being associated with the main lobe. For example, the UE 120 may calculate a PHR value that is less than a lowest PHR value indicated by the six-bit PHR bit-field and may utilize the greater range of PHR values to accurately report the calculated PHR value to the base station 110.

Alternatively, and/or additionally, the PHR bit-field may be greater than six bits to enable the UE 120 to indicate that a grating lobe is associated with the main lobe. For example, a seventh bit of the PHR bit-field may be a first value (e.g., 0) when a grating lobe is not associated with the main lobe and may be a second value (e.g., 1) when a grating lobe is associated with the main lobe.

In some aspects, the PHR bit-field may be greater than six bits based at least in part on an operational mode of the UE 120. The UE 120 may transition from a first operational mode to a second operational mode based at least in part on the beam being associated with a grating lobe and a main lobe. The PHR parameter may be associated with a first PHR bit-field when the UE 120 is in the first operational mode and may be associated with a second PHR bit-field when the UE 120 is in the second operational mode. In some aspects, the first PHR bit-field may comprise a six-bit PHR bit-field and the second PHR bit-field may comprise a PHR bit-field that is greater than six bits. In some aspects, the first operational mode may be associated with a sub-band/wide band power control operation with a 6 bit PHR bit-field for normal/main lobe operation, and the second operation mode may comprise a larger PHR bit-field for grating lobe operation.

In some aspects, a configuration of the second PHR bit-field is based at least in part on a steering angle of the beam, a frequency of operation, and/or an inter-antenna element spacing associated with an antenna array of the UE 120. In some aspects, the PHR bit-field is configured by the UE 120 based at least in part on the UE 120 transitioning to the second operational mode. In some aspects, the configuration of the second bit field may be based at least in part on an array size of the UE 120 (e.g., a size of the antenna array, an element spacing associated with the antenna array). Additionally, or alternatively, the configuration of the second bit-field may be based at least in part on a frequency coverage of the UE 120. The frequency coverage may identify an operating frequency, a bandwidth of the UE 120, a range of frequencies expected to be covered by the UE, or the like.

In some aspects, the PHR bit-field is configured by the base station 110. In some aspects, the UE 120 may transmit data indicating that the UE 120 is transitioning to or operating in the second operational mode based at least in part on the grating lobe being associated with the main lobe. For example, the UE 120 may indicate which operational mode is active. In some aspects, the UE 120 may transmit the data indicating that the UE 120 is transitioning to or operating in the second operational mode with the PHR parameter (e.g., via a PHR report). In some aspects, the UE 120 may transmit the data indicating that the UE 120 is transitioning to or operating in the second operational mode separately from the PHR parameter and/or the PHR report. The base station 110 may receive the data from the UE 120 and may transmit information indicating a configuration of the second PHR bit-field to the UE 120 based at least in part on receiving the data. Thus, the configuration of bit-fields for grating lobe operation can be configured by the UE 120 or the base station 110.

In some aspects, the UE 120 may transmit one or more additional parameters associated with the grating lobe. In some aspects, the one or more additional parameters may be for interference management. In some aspects, the one or more additional parameters may include information for interference management regarding the grating lobe on a per-component carrier (CC) level or a per-cell-group level. The one or more additional parameters may include a parameter indicating that the grating lobe is associated with the main lobe, a parameter indicating a direction associated with the grating lobe, a parameter indicating a power of the grating lobe, or the like. The UE 120 may transmit the one or more additional parameters via downlink control information (DCI), a MAC-CE, or RRC signaling, among other examples.

In some aspects, the one or more additional parameters may include a parameter indicating a transmit power relationship between the grating lobe and the main lobe. In some aspects, the transmit power relationship may be associated with (e.g., identify) a difference between the power of the grating lobe and the power of the main lobe.

In some aspects, the one or more additional parameters may include a power control parameter. For example, the one or more additional parameters may include a closed-loop power control parameter (e.g., f(i)). In some aspects, a value of the closed-loop power control parameter may be based at least in part on a steering angle of the beam, a frequency of operation associated with the UE 120, an inter-antenna element spacing associated with an antenna array of the UE 120, and/or the like.

In some aspects, the UE 120 may receive information indicating a set of spatial relationships for a set of beams for which the one or more additional parameters are not to be transmitted. The UE 120 may determine whether the beam is included in the set of beams. The UE 120 may not transmit the one or more additional parameters when the beam is included in the set of beams. Thus, the UE 120 and the base station 110 may reduce reporting overhead.

As shown by reference number 415, the UE 120 and the base station 110 may perform a communication based at least in part on the PHR parameter. In some aspects, the base station 110 may determine that a grating lobe is associated with a main lobe of a beam associated with the UE 120 based at least in part on the PHR parameter. The base station 110 may perform one or more operations (e.g., one or more power control operations, one or more power control functions, one or more scheduling functions, and/or the like) based at least in part on the PHR value indicated by the PHR parameter and/or based at least in part on the grating lobe being associated with the main lobe of the beam associated with the UE 120. In some other aspects, the base station 110 may perform the one or more operations without having determined that the grating lobe is associated with the main lobe of the beam. For example, the base station 110 may use the indicated PHR parameter for the one or more operations without determining that the grating lobe is associated with the main lobe. The UE 120 may receive a power control command based at least in part on the base station 110 performing the one or more operations. The UE 120 and the base station 110 may perform a communication based at least in part on the power control command.

In some aspects, the UE 120 performs the communication based at least in part on a transmit power level corresponding to the estimated transmission power level calculated by the UE 120. In some aspects, the UE 120 may signal a parameter indicating a power control loop parameter associated with a grating lobe adjustment based at least in part on performing the communication based at least in part on the transmit power level.

As indicated above, FIGS. 4 and 5 are provided as examples. Other examples may differ from what is described with respect to FIGS. 4 and 5.

Figure 6:
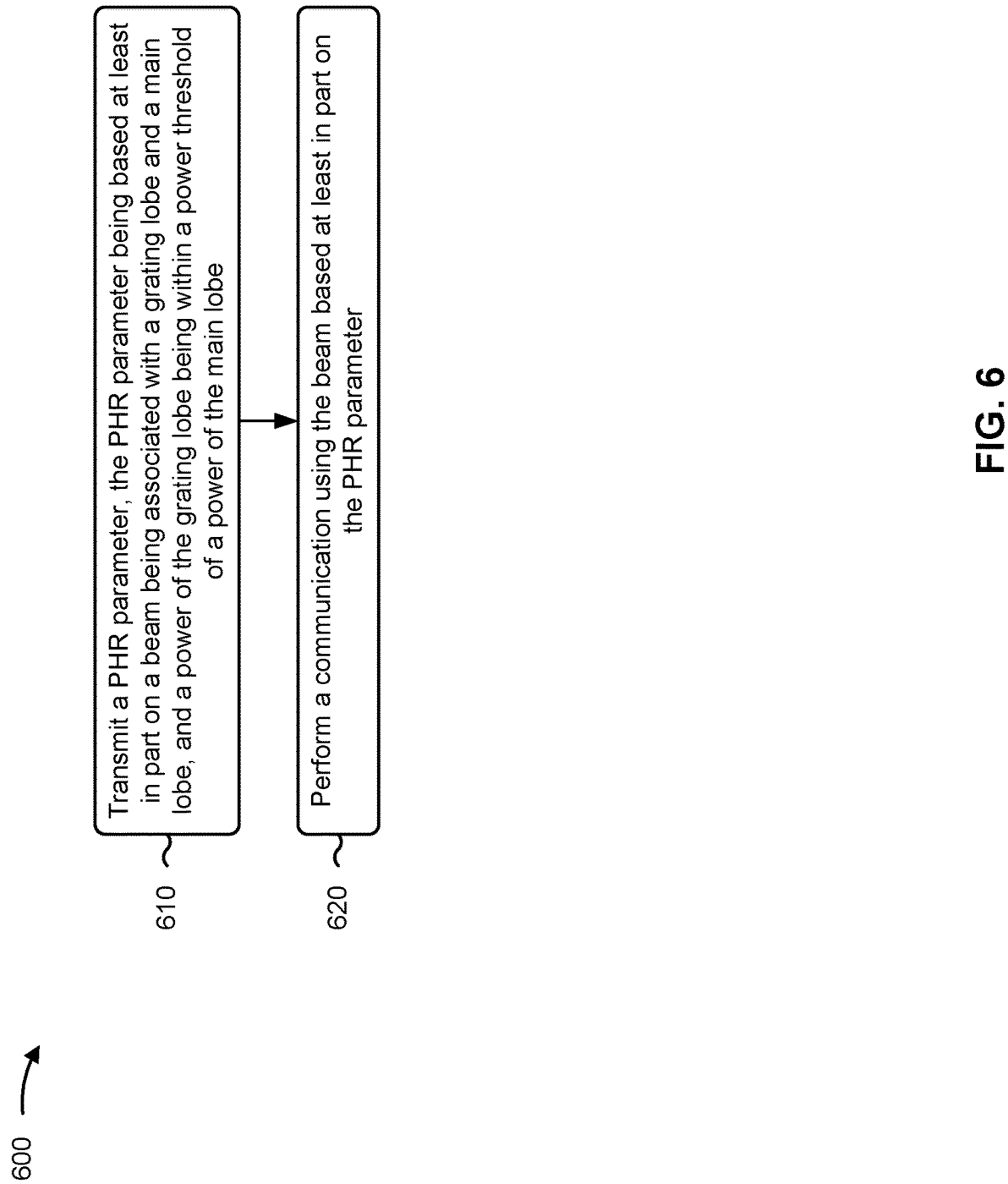
FIGS. 6 and 7 are diagrams illustrating example processes associated with PHR reporting with grating lobes, in accordance with the present disclosure.

FIG. 6 is a diagram illustrating an example process 600 performed, for example, by a UE (e.g., UE 120), in accordance with the present disclosure. Example process 600 is an example where an apparatus of the UE (e.g., UE 120) performs operations associated with power headroom reporting with grating lobes.

As shown in FIG. 6, in some aspects, process 600 may include transmitting a PHR parameter, the PHR parameter being based at least in part on a beam being associated with a grating lobe and a main lobe, and a power of the grating lobe being within a power threshold of a power of the main lobe (block 610). For example, the apparatus (e.g., using communication manager 140 and/or transmission component 804, depicted in FIG. 8) may transmit a PHR parameter, the PHR parameter being based at least in part on a beam being associated with a grating lobe and a main lobe, and a power of the grating lobe being within a power threshold of a power of the main lobe, as described above.

As further shown in FIG. 6, in some aspects, process 600 may include performing a communication using the beam based at least in part on the PHR parameter (block 620). For example, the apparatus (e.g., using communication manager 140 and/or performance component 808, depicted in FIG. 8) may perform a communication using the beam based at least in part on the PHR parameter, as described above.

Process 600 may include additional aspects, such as any single aspect or any combination of aspects described below and/or in connection with one or more other processes described elsewhere herein.

In a first aspect, the PHR parameter indicates that the grating lobe is associated with the main lobe of the beam.

In a second aspect, alone or in combination with the first aspect, process 600 includes transmitting a parameter indicating that the grating lobe is associated with the main lobe.

In a third aspect, alone or in combination with one or more of the first and second aspects, process 600 includes transmitting a parameter indicating a transmit power relationship between the grating lobe and the main lobe.

In a fourth aspect, alone or in combination with one or more of the first through third aspects, process 600 includes receiving a power control command based at least in part on the PHR parameter.

In a fifth aspect, alone or in combination with one or more of the first through fourth aspects, the transmit power relationship is associated with a difference between the power of the grating lobe and the power of the main lobe.

In a sixth aspect, alone or in combination with one or more of the first through fifth aspects, process 600 includes transmitting a parameter indicating that the grating lobe may interfere with a transmission associated with another UE.

In a seventh aspect, alone or in combination with one or more of the first through sixth aspects, process 600 includes transmitting one or more additional parameters associated with the grating lobe for interference management.

In an eighth aspect, alone or in combination with one or more of the first through seventh aspects, the one or more additional parameters are transmitted via one or more of downlink control information (DCI), a MAC-CE, or RRC signaling.

In a ninth aspect, alone or in combination with one or more of the first through eighth aspects, the one or more additional parameters include information for interference management regarding the grating lobe on a per-CC level or a per-cell-group level.

In a tenth aspect, alone or in combination with one or more of the first through ninth aspects, process 600 includes receiving information indicating a set of spatial relationships for a set of beams for which the one or more additional parameters are not to be transmitted.

In an eleventh aspect, alone or in combination with one or more of the first through tenth aspects, the PHR parameter is greater than six bits.

In a twelfth aspect, alone or in combination with one or more of the first through eleventh aspects, the UE operates in a first operational mode associated with a 6-bit PHR bit-field when the beam is not associated with the grating lobe, and wherein the UE operates in a second operational mode associated with a PHR bit-field that is greater than six bits when the beam is associated with the grating lobe.

In a thirteenth aspect, alone or in combination with one or more of the first through twelfth aspects, process 600 includes transmitting data indicating that the UE is operating in the second operational mode based at least in part on the beam being associated with the grating lobe.

In a fourteenth aspect, alone or in combination with one or more of the first through thirteenth aspects, the PHR parameter is transmitted separately from the data indicating that the UE is operating in the second operational mode.

In a fifteenth aspect, alone or in combination with one or more of the first through fourteenth aspects, a configuration of the PHR bit-field that is greater than six bits is configured by the UE based at least in part on the UE operating in the second operational mode.

In a sixteenth aspect, alone or in combination with one or more of the first through fifteenth aspects, a configuration of the PHR bit-field that is greater than six bits is configured by a wireless node associated with the UE based at least in part on the UE operating in the second operational mode.

In a seventeenth aspect, alone or in combination with one or more of the first through sixteenth aspects, the configuration of the PHR bit-field that is greater than six bits is based at least in part on one or more of an array size or a frequency coverage associated with the UE.

In an eighteenth aspect, alone or in combination with one or more of the first through seventeenth aspects, process 600 includes transmitting an indication of a closed-loop power control parameter, wherein a value of the closed-loop power control parameter is based at least in part on one or more of a steering angle of the beam or a frequency of operation or an inter-antenna element spacing associated with an antenna array of the UE.

In a nineteenth aspect, alone or in combination with one or more of the first through eighteenth aspects, the communication using the beam based at least in part on the PHR parameter is performed using a transmit power level, and wherein the method further comprises determining the transmit power level in accordance with a parameter indicating a power control loop parameter associated with a grating lobe adjustment.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
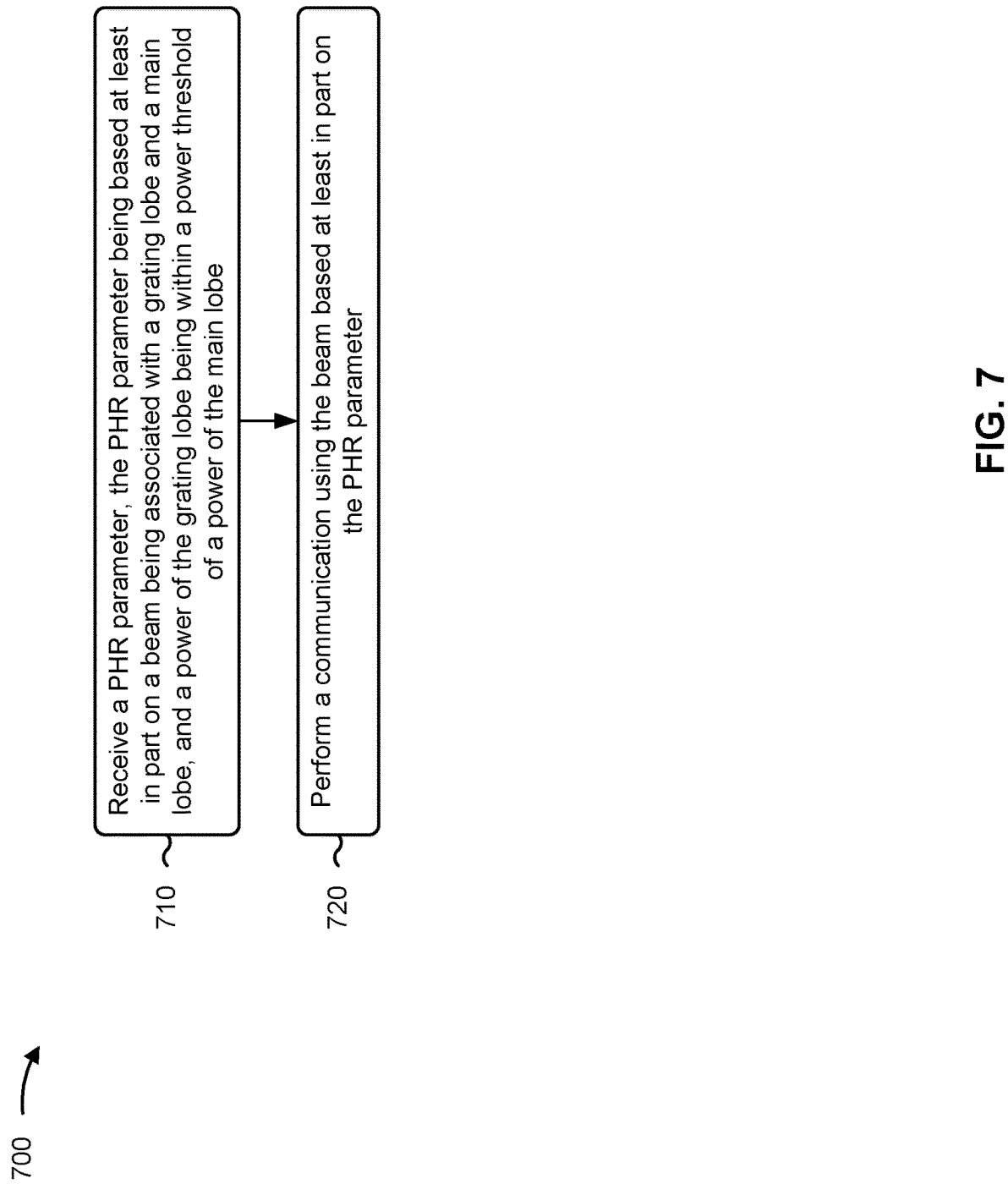

FIG. 7 is a diagram illustrating an example process 700 performed, for example, by a base station, in accordance with the present disclosure. Example process 700 is an example where an apparatus of the base station (e.g., base station 110) performs operations associated with power headroom reporting with grating lobes.

As shown in FIG. 7, in some aspects, process 700 may include receiving a PHR parameter, the PHR parameter being based at least in part on a beam being associated with a grating lobe and a main lobe, and a power of the grating lobe being within a power threshold of a power of the main lobe (block 710). For example, the apparatus (e.g., using communication manager 150 and/or reception component 902, depicted in FIG. 9) may receive a PHR parameter, the PHR parameter being based at least in part on a beam being associated with a grating lobe and a main lobe, and a power of the grating lobe being within a power threshold of a power of the main lobe, as described above.

As further shown in FIG. 7, in some aspects, process 700 may include performing a communication using the beam based at least in part on the PHR parameter (block 720). For example, the apparatus (e.g., using communication manager 150 and/or performance component 908, depicted in FIG. 9) may perform a communication using the beam based at least in part on the PHR parameter, as described above.

Process 700 may include additional aspects, such as any single aspect or any combination of aspects described below and/or in connection with one or more other processes described elsewhere herein.

In a first aspect, the PHR parameter indicates that the grating lobe is associated with the main lobe of the beam.

In a second aspect, alone or in combination with the first aspect, process 700 includes receiving a parameter indicating that the grating lobe is associated with the main lobe.

In a third aspect, alone or in combination with one or more of the first and second aspects, process 700 includes receiving a parameter indicating a transmit power relationship between the grating lobe and the main lobe.

In a fourth aspect, alone or in combination with one or more of the first through third aspects, process 700 includes transmitting a power control command based at least in part on the PHR parameter.

In a fifth aspect, alone or in combination with one or more of the first through fourth aspects, the transmit power relationship is associated with a difference between the power of the grating lobe and the power of the main lobe.

In a sixth aspect, alone or in combination with one or more of the first through fifth aspects, process 700 includes receiving a parameter indicating that the grating lobe may interfere with a transmission associated with a UE associated with the base station other than a UE that transmitted the PHR parameter.

In a seventh aspect, alone or in combination with one or more of the first through sixth aspects, process 700 includes receiving one or more additional parameters associated with the grating lobe for interference management.

In an eighth aspect, alone or in combination with one or more of the first through seventh aspects, the one or more additional parameters are received via one or more of DCI, a MAC-CE, or RRC signaling.

In a ninth aspect, alone or in combination with one or more of the first through eighth aspects, the one or more additional parameters include information for interference management regarding the grating lobe on a per-CC level or a per-cell-group level.

In a tenth aspect, alone or in combination with one or more of the first through ninth aspects, process 700 includes transmitting information indicating a set of spatial relationships for a set of beams for which the one or more additional parameters are not to be transmitted.

In an eleventh aspect, alone or in combination with one or more of the first through tenth aspects, the PHR parameter is greater than six bits.

In a twelfth aspect, alone or in combination with one or more of the first through eleventh aspects, a UE associated with the PHR parameter operates in a first operational mode associated with a 6-bit PHR bit-field when the beam is not associated with the grating lobe, and wherein the UE operates in a second operational mode associated with a PHR bit-field that is greater than six bits when the beam is associated with the grating lobe.

In a thirteenth aspect, alone or in combination with one or more of the first through twelfth aspects, process 700 includes receiving data indicating that the UE is operating in the second operational mode based at least in part on the beam being associated with the grating lobe.

In a fourteenth aspect, alone or in combination with one or more of the first through thirteenth aspects, the PHR parameter is received separately from the data indicating that the UE is operating in the second operation mode.

In a fifteenth aspect, alone or in combination with one or more of the first through fourteenth aspects, a configuration of the PHR bit-field that is greater than six bits is configured by the UE based at least in part on the UE operating in the second operational mode.

In a sixteenth aspect, alone or in combination with one or more of the first through fifteenth aspects, a configuration of the PHR bit-field that is greater than six bits is configured by the wireless node.

In a seventeenth aspect, alone or in combination with one or more of the first through sixteenth aspects, the configuration of the PHR bit-field that is greater than six bits is based at least in part on one or more of an array size or a frequency coverage associated with the UE.

In an eighteenth aspect, alone or in combination with one or more of the first through seventeenth aspects, process 700 includes receiving an indication of a closed-loop power control parameter, wherein a value of the closed-loop power control parameter is based at least in part on one or more of a steering angle of the beam or a frequency of operation or inter-antenna element spacing associated with an antenna array of the UE.

In a nineteenth aspect, alone or in combination with one or more of the first through eighteenth aspects, the communication using the beam based at least in part on the PHR parameter is performed using a transmit power level, and wherein the method further comprises signaling a parameter indicating a power control loop parameter associated with a grating lobe adjustment.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
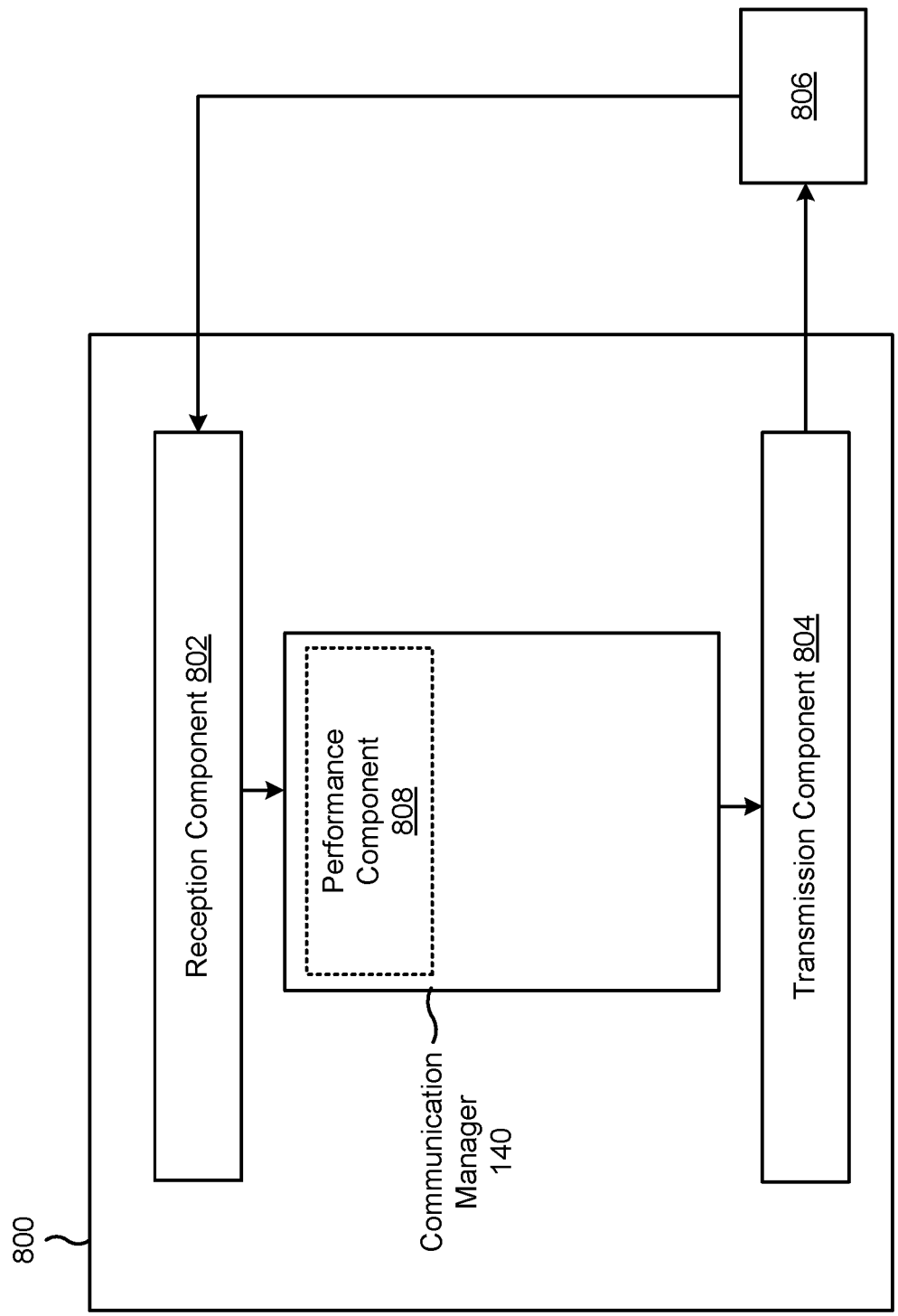
FIGS. 8 and 9 are block diagrams of example apparatuses for wireless communication, in accordance with the present disclosure.

FIG. 8 is a diagram of an example apparatus 800 for wireless communication. The apparatus 800 may be a UE (e.g., UE 120), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a performance component 808, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit a PHR parameter, wherein the PHR parameter is based at least in part on a beam being associated with a grating lobe and a main lobe, and wherein a power of the grating lobe is within a power threshold of a power of the main lobe. The performance component 808 may perform a communication using the beam based at least in part on the PHR parameter.

The transmission component 804 may transmit a parameter indicating that the grating lobe is associated with the main lobe.

The transmission component 804 may transmit a parameter indicating a transmit power relationship between the grating lobe and the main lobe.

The reception component 802 may receive a power control command based at least in part on the PHR parameter.

The transmission component 804 may transmit a parameter indicating that the grating lobe may interfere with a transmission associated with another UE.

The transmission component 804 may transmit one or more additional parameters associated with the grating lobe for interference management.

The reception component 802 may receive information indicating a set of spatial relationships for a set of beams for which the one or more additional parameters are not to be transmitted.

The transmission component 804 may transmit data indicating that the UE is operating in the second operational mode based at least in part on the beam being associated with the grating lobe.

The transmission component 804 may transmit an indication of a closed-loop power control parameter, wherein a value of the closed-loop power control parameter is based at least in part on one or more of a steering angle of the beam or a frequency of operation or an inter-antenna element spacing associated with an antenna array of the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
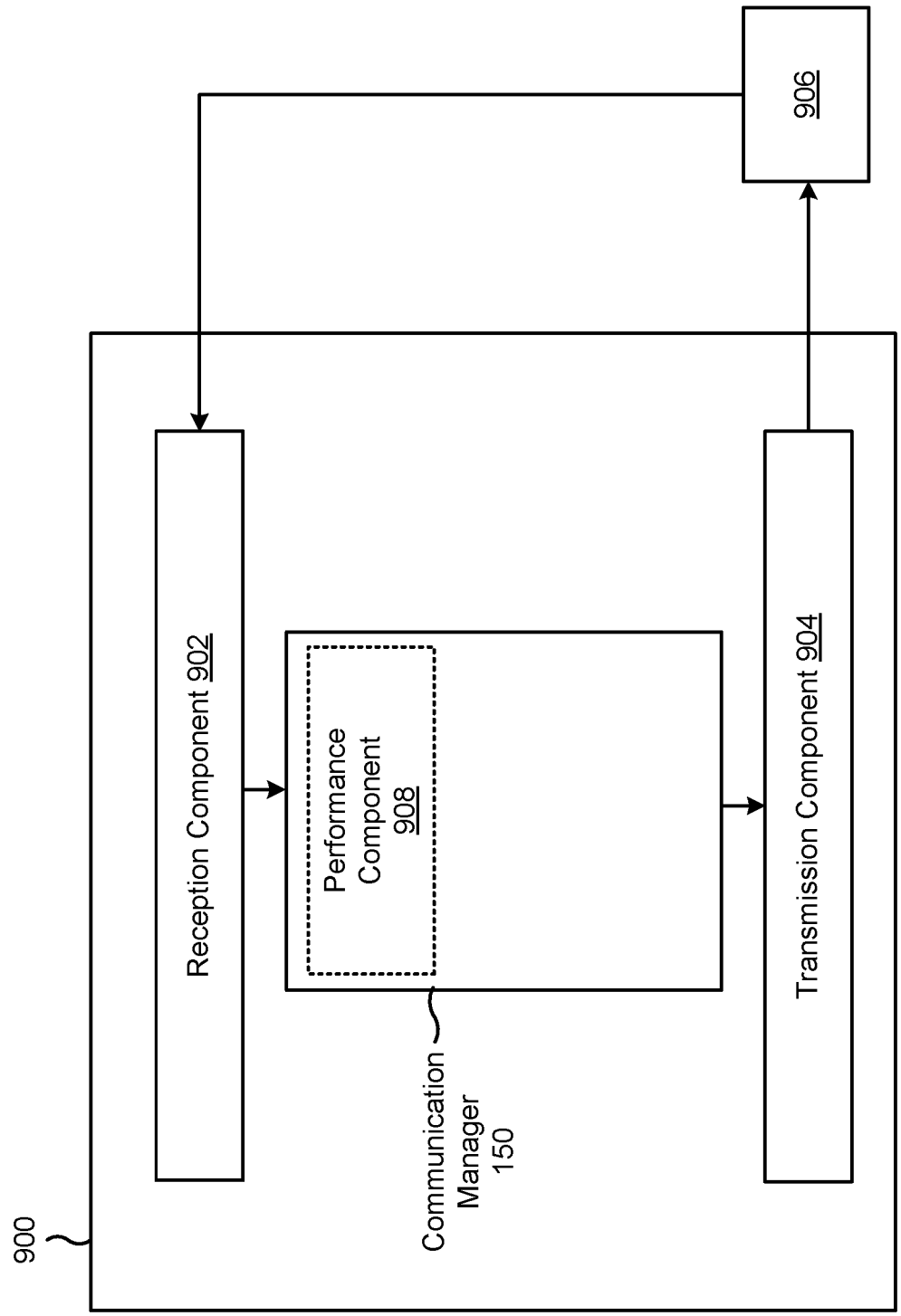

FIG. 9 is a diagram of an example apparatus 900 for wireless communication. The apparatus 900 may be a base station (e.g., base station 110), or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a performance component 908, among other examples.

In some aspects, the apparatus 900 may be configured to perform one or more operations described herein in connection with FIGS. 4 and 5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The reception component 902 may receive a PHR parameter, wherein the PHR parameter is based at least in part on a beam being associated with a grating lobe and a main lobe, and wherein a power of the grating lobe is within a power threshold of a power of the main lobe. The performance component 908 may perform a communication using the beam based at least in part on the PHR parameter.

The reception component 902 may receive a parameter indicating that the grating lobe is associated with the main lobe.

The reception component 902 may receive a parameter indicating a transmit power relationship between the grating lobe and the main lobe.

The transmission component 904 may transmit a power control command based at least in part on the PHR parameter.

The reception component 902 may receive a parameter indicating that the grating lobe may interfere with a transmission associated with a user equipment (UE) associated with the wireless node other than a UE that transmitted the PHR parameter.

The reception component 902 may receive one or more additional parameters associated with the grating lobe for interference management.

The transmission component 904 may transmit information indicating a set of spatial relationships for a set of beams for which the one or more additional parameters are not to be transmitted.

The reception component 902 may receive data indicating that the UE is operating in the second operational mode based at least in part on the beam being associated with the grating lobe.

The reception component 902 may receive an indication of a closed-loop power control parameter, wherein a value of the closed-loop power control parameter is based at least in part on one or more of a steering angle of the beam or a frequency of operation or inter-antenna element spacing associated with an antenna array of the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by an apparatus of a UE, comprising: transmitting a PHR parameter, wherein the PHR parameter is based at least in part on a beam being associated with a grating lobe and a main lobe, and wherein a power of the grating lobe is within a power threshold of a power of the main lobe; and performing a communication using the beam based at least in part on the PHR parameter.

Aspect 2: The method of Aspect 1, wherein the PHR parameter indicates that the grating lobe is associated with the main lobe of the beam.

Aspect 3: The method of Aspect 1, further comprising: transmitting a parameter indicating that the grating lobe is associated with the main lobe.

Aspect 4: The method of one or more of Aspects 1 through 3, further comprising: transmitting a parameter indicating a transmit power relationship between the grating lobe and the main lobe.

Aspect 5: The method of one or more of Aspects 1 through 4, further comprising: receiving a power control command based at least in part on the PHR parameter.

Aspect 6: The method of Aspect 4, wherein the transmit power relationship is associated with a difference between the power of the grating lobe and the power of the main lobe.

Aspect 7: The method of one or more of Aspects 1 through 6, further comprising: transmitting a parameter indicating that the grating lobe may interfere with a transmission associated with another UE.

Aspect 8: The method of one or more of Aspects 1 through 3, further comprising: transmitting one or more additional parameters associated with the grating lobe for interference management.

Aspect 9: The method of Aspect 8, wherein the one or more additional parameters are transmitted via one or more of: DCI, a MAC-CE, or RRC signaling.

Aspect 10: The method of Aspect 8, wherein the one or more additional parameters include information for interference management regarding the grating lobe on a per-CC level or a per-cell-group level.

Aspect 11: The method of Aspect 8, further comprising: receiving information indicating a set of spatial relationships for a set of beams for which the one or more additional parameters are not to be transmitted.

Aspect 12: The method of one or more of Aspects 1 through 11, wherein the PHR parameter is greater than six bits.

Aspect 13: The method of one or more of Aspects 1 through 12, wherein the UE operates in a first operational mode associated with a 6-bit PHR bit-field when the beam is not associated with the grating lobe, and wherein the UE operates in a second operational mode associated with a PHR bit-field that is greater than six bits when the beam is associated with the grating lobe.

Aspect 14: The method of Aspect 13, further comprising: transmitting data indicating that the UE is operating in the second operational mode based at least in part on the beam being associated with the grating lobe.

Aspect 15: The method of Aspect 14, wherein the PHR parameter is transmitted separately from the data indicating that the UE is operating in the second operational mode.

Aspect 16: The method of Aspect 13, wherein a configuration of the PHR bit-field that is greater than six bits is configured by the UE based at least in part on the UE operating in the second operational mode.

Aspect 17: The method of Aspect 13, wherein a configuration of the PHR bit-field that is greater than six bits is configured by a wireless node associated with the UE based at least in part on the UE operating in the second operational mode.

Aspect 18: The method of Aspect 17, wherein the configuration of the PHR bit-field that is greater than six bits is based at least in part on one or more of an array size or a frequency coverage associated with the UE.

Aspect 19: The method of one or more of Aspects 1 through 18, further comprising: transmitting an indication of a closed-loop power control parameter, wherein a value of the closed-loop power control parameter is based at least in part on one or more of a steering angle of the beam or a frequency of operation or an inter-antenna element spacing associated with an antenna array of the UE.

Aspect 20: The method of one or more of Aspects 1 through 19, wherein the communication using the beam based at least in part on the PHR parameter is performed using a transmit power level, and wherein the method further comprises: determining the transmit power level in accordance with a parameter indicating a power control loop parameter associated with a grating lobe adjustment.

Aspect 21: A method of wireless communication performed by an apparatus of a wireless node, comprising: receiving a PHR parameter, wherein the PHR parameter is based at least in part on a beam being associated with a grating lobe and a main lobe, and wherein a power of the grating lobe is within a power threshold of a power of the main lobe; and performing a communication using the beam based at least in part on the PHR parameter.

Aspect 22: The method of Aspect 21, wherein the PHR parameter indicates that the grating lobe is associated with the main lobe of the beam.

Aspect 23: The method of one or more of Aspects 21 and 22, further comprising: receiving a parameter indicating that the grating lobe is associated with the main lobe.

Aspect 24: The method of one or more of Aspects 21 through 23, further comprising: receiving a parameter indicating a transmit power relationship between the grating lobe and the main lobe.

Aspect 25: The method of Aspect 24, further comprising: transmitting a power control command based at least in part on the PHR parameter.

Aspect 26: The method of Aspect 24, wherein the transmit power relationship is associated with a difference between the power of the grating lobe and the power of the main lobe.

Aspect 27: The method of one or more of Aspects 21 through 26, further comprising: receiving a parameter indicating that the grating lobe may interfere with a transmission associated with a UE associated with the wireless node other than a UE that transmitted the PHR parameter.

Aspect 28: The method of one or more of Aspects 21 through 27, further comprising: receiving one or more additional parameters associated with the grating lobe for interference management.

Aspect 29: The method of Aspect 28, wherein the one or more additional parameters are received via one or more of: DCI, a MAC-CE, or RRC signaling.

Aspect 30: The method of Aspect 28, wherein the one or more additional parameters include information for interference management regarding the grating lobe on a per-CC level or a per-cell-group level.

Aspect 31: The method of Aspect 28, further comprising: transmitting information indicating a set of spatial relationships for a set of beams for which the one or more additional parameters are not to be transmitted.

Aspect 32: The method of one or more of Aspects 21 through 31, wherein the PHR parameter is greater than six bits.

Aspect 33: The method of one or more of Aspects 21 through 32, wherein a UE associated with the PHR parameter operates in a first operational mode associated with a 6-bit PHR bit-field when the beam is not associated with the grating lobe, and wherein the UE operates in a second operational mode associated with a PHR bit-field that is greater than six bits when the beam is associated with the grating lobe.

Aspect 34: The method of Aspect 33, further comprising: receiving data indicating that the UE is operating in the second operational mode based at least in part on the beam being associated with the grating lobe.

Aspect 35: The method of Aspect 34, wherein the PHR parameter is received separately from the data indicating that the UE is operating in the second operation mode.

Aspect 36: The method of Aspect 33, wherein a configuration of the PHR bit-field that is greater than six bits is configured by the UE based at least in part on the UE operating in the second operational mode.

Aspect 37: The method of Aspect 33, wherein a configuration of the PHR bit-field that is greater than six bits is configured by the wireless node.

Aspect 38: The method of Aspect 37, wherein the configuration of the PHR bit-field that is greater than six bits is based at least in part on one or more of an array size or a frequency coverage associated with the UE.

Aspect 39: The method of one or more of Aspects 21 through 38, further comprising: receiving an indication of a closed-loop power control parameter, wherein a value of the closed-loop power control parameter is based at least in part on one or more of a steering angle of the beam or a frequency of operation or inter-antenna element spacing associated with an antenna array of the UE.

Aspect 40: The method of one or more of Aspects 21 through 39, wherein the communication using the beam based at least in part on the PHR parameter is performed using a transmit power level, and wherein the method further comprises: signaling a parameter indicating a power control loop parameter associated with a grating lobe adjustment.

Aspect 41: An apparatus for wireless communication at a device, comprising a processor; memory coupled with the processor; and instructions stored in the memory and executable by the processor to cause the apparatus to perform the method of one or more of Aspects 1 through 20.

Aspect 42: A device for wireless communication, comprising a memory and one or more processors coupled to the memory, the one or more processors configured to perform the method of one or more of Aspects 1 through 20.

Aspect 43: An apparatus for wireless communication, comprising at least one means for performing the method of one or more of Aspects 1 through 20.

Aspect 44: A non-transitory computer-readable medium storing code for wireless communication, the code comprising instructions executable by a processor to perform the method of one or more of Aspects 1 through 20.

Aspect 45: A non-transitory computer-readable medium storing a set of instructions for wireless communication, the set of instructions comprising one or more instructions that, when executed by one or more processors of a device, cause the device to perform the method of one or more of Aspects 1 through 20.

Aspect 41: An apparatus for wireless communication at a device, comprising a processor; memory coupled with the processor; and instructions stored in the memory and executable by the processor to cause the apparatus to perform the method of one or more of Aspects 21 through 40.

Aspect 42: A device for wireless communication, comprising a memory and one or more processors coupled to the memory, the one or more processors configured to perform the method of one or more of Aspects 21 through 40.

Aspect 43: An apparatus for wireless communication, comprising at least one means for performing the method of one or more of Aspects 21 through 40.

Aspect 44: A non-transitory computer-readable medium storing code for wireless communication, the code comprising instructions executable by a processor to perform the method of one or more of Aspects 21 through 40.

Aspect 45: A non-transitory computer-readable medium storing a set of instructions for wireless communication, the set of instructions comprising one or more instructions that, when executed by one or more processors of a device, cause the device to perform the method of one or more of Aspects 21 through 40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:
   a memory; and
   one or more processors, coupled to the memory, configured to:
      transmit a power headroom (PHR) parameter, wherein the PHR parameter is based at least in part on a determination of whether a beam is associated with a grating lobe and a main lobe, and wherein a power of the grating lobe is within a power threshold of a power of the main lobe;
      transmit an indication of whether the grating lobe is associated with the main lobe; and
      perform a communication using the beam based at least in part on the PHR parameter.

2. The apparatus of claim 1, wherein the PHR parameter includes the indication that the grating lobe is associated with the main lobe of the beam.

3. The apparatus of claim 1, wherein the one or more processors are configured to transmit the indication by being configured to:
   transmit a parameter separate from the PHR parameter indicating that the grating lobe is associated with the main lobe.

4. The apparatus of claim 1, wherein the one or more processors are further configured to:
   transmit a parameter indicating a transmit power relationship between the grating lobe and the main lobe.

5. The apparatus of claim 4, wherein the one or more processors are further configured to:
   receive a power control command based at least in part on the PHR parameter.

6. The apparatus of claim 4, wherein the transmit power relationship is associated with a difference between the power of the grating lobe and the power of the main lobe.

7. The apparatus of claim 1, wherein the one or more processors are further configured to:
   transmit a parameter indicating that the grating lobe may interfere with a transmission associated with another UE.

8. The apparatus of claim 1, wherein the one or more processors are further configured to:
   transmit one or more additional parameters associated with the grating lobe for interference management.

9. The apparatus of claim 8, wherein the one or more additional parameters include information for interference management regarding the grating lobe on a per-component carrier (CC) level or a per-cell-group level.

10. The apparatus of claim 8, wherein the one or more processors are further configured to:
    receive information indicating a set of spatial relationships for a set of beams for which the one or more additional parameters are not to be transmitted.

11. The apparatus of claim 1, wherein the PHR parameter is greater than six bits.

12. The apparatus of claim 1, wherein the UE is configured to operate in a first operational mode associated with a first PHR bit-field size when the UE determines that the beam is not associated with the grating lobe, and wherein the UE is configured to operate in a second operational mode associated with a second PHR bit-field size that is greater than the first PHR bit-field size when the UE determines that the beam is associated with the grating lobe.

13. The apparatus of claim 12, wherein the one or more processors are further configured to:
    transmit data indicating that the UE is operating in the second operational mode based at least in part on the beam being associated with the grating lobe.

14. The apparatus of claim 12, wherein the first PHR bit-field size is six bits, and wherein the second PHR bit-field size is configured by the UE to be greater than six bits based at least in part on the UE operating in the second operational mode.

15. The apparatus of claim 12, wherein the first PHR bit-field size is six bits, and wherein the second PHR bit-field size is configured by a wireless node associated with the UE to be greater than six bits based at least in part on the UE operating in the second operational mode.

16. The apparatus of claim 1, wherein the one or more processors are further configured to:
    transmit an indication of a closed-loop power control parameter, wherein a value of the closed-loop power control parameter is based at least in part on one or more of a steering angle of the beam or a frequency of operation or an inter-antenna element spacing associated with an antenna array of the UE.

17. An apparatus of a wireless node for wireless communication, comprising:
    a memory; and
    one or more processors, coupled to the memory, configured to:
       receive a power headroom (PHR) parameter, wherein the PHR parameter is based at least in part on a determination of whether a beam is associated with a grating lobe and a main lobe, and wherein a power of the grating lobe is within a power threshold of a power of the main lobe;
       receive an indication of whether the grating lobe is associated with the main lobe; and perform a communication using the beam based at least in part on the PHR parameter.

18. The apparatus of claim 17, wherein the one or more processors are further configured to:
receive a parameter indicating a transmit power relationship between the grating lobe and the main lobe.

19. The apparatus of claim 18, wherein the transmit power relationship is associated with a difference between the power of the grating lobe and the power of the main lobe.

20. The apparatus of claim 17, wherein the one or more processors are further configured to:
receive one or more additional parameters associated with the grating lobe for interference management.

21. The apparatus of claim 20, wherein the one or more processors are further configured to:
transmit information indicating a set of spatial relationships for a set of beams for which the one or more additional parameters are not to be transmitted.

22. The apparatus of claim 17, wherein the PHR parameter is received from a UE operating in a first operational mode that uses a first PHR bit-field size when the beam is not associated with the grating lobe, and wherein the PHR parameter is received from the UE operating in a second operational mode that uses a second PHR bit-field size that is greater than the first PHR bit-field size when the beam is associated with the grating lobe.

23. The apparatus of claim 22, wherein the one or more processors are further configured to:
receive data indicating that the UE is operating in the second operational mode based at least in part on the beam being associated with the grating lobe.

24. The apparatus of claim 22, wherein the first PHR bit-field size is six bits, and wherein the second PHR bit-field size is configured by the UE to be greater than six bits based at least in part on the UE operating in the second operational mode.

25. The apparatus of claim 22, wherein the first PHR bit-field size is six bits, and wherein the second PHR bit-field size is configured by the wireless node to be greater than six bits.

26. The apparatus of claim 25, wherein the first PHR bit-field size is six bits, and wherein the second PHR bit-field size is configured to be greater than six bits based at least in part on one or more of an array size or a frequency coverage associated with the UE.

27. A method of wireless communication performed by an apparatus of a user equipment (UE), comprising:
transmitting a power headroom (PHR) parameter, wherein the PHR parameter is based at least in part on a determination of whether a beam is associated with a grating lobe and a main lobe, and wherein a power of the grating lobe is within a power threshold of a power of the main lobe;
transmitting an indication of whether the grating lobe is associated with the main lobe; and
performing a communication using the beam based at least in part on the PHR parameter.

28. The method of claim 27, wherein the PHR parameter includes the indication that the grating lobe is associated with the main lobe of the beam.

29. A method of wireless communication performed by an apparatus of a base station, comprising:
receiving a power headroom (PHR) parameter, wherein the PHR parameter is based at least in part on a determination of whether a beam is associated with a grating lobe and a main lobe, and wherein a power of the grating lobe is within a power threshold of a power of the main lobe;
receiving an indication of whether the grating lobe is associated with the main lobe; and
performing a communication using the beam based at least in part on the PHR parameter.

30. The method of claim 29, further comprising:
receiving a parameter indicating a transmit power relationship between the grating lobe and the main lobe.

* * * * *